Patented Sept. 26, 1922.

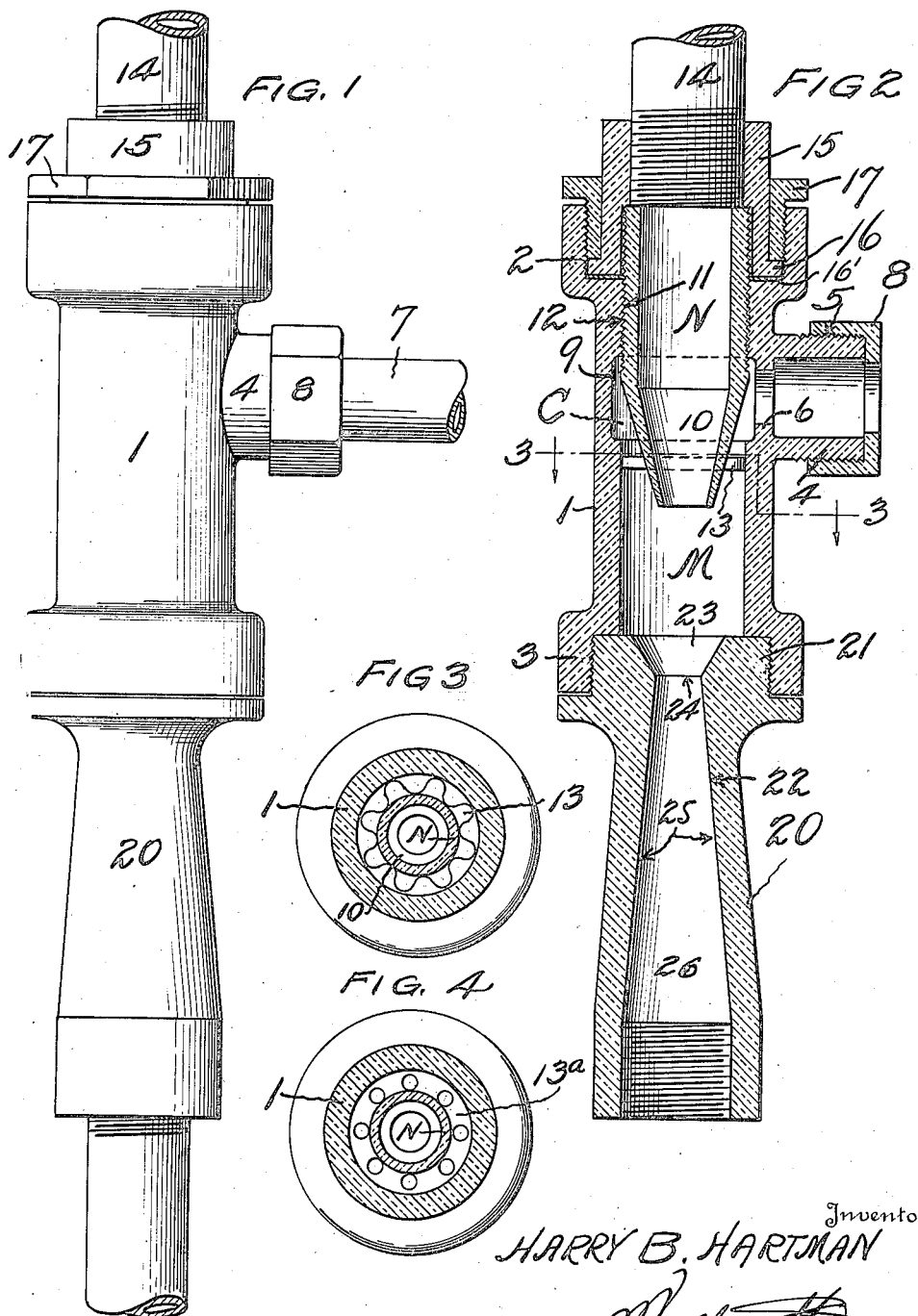

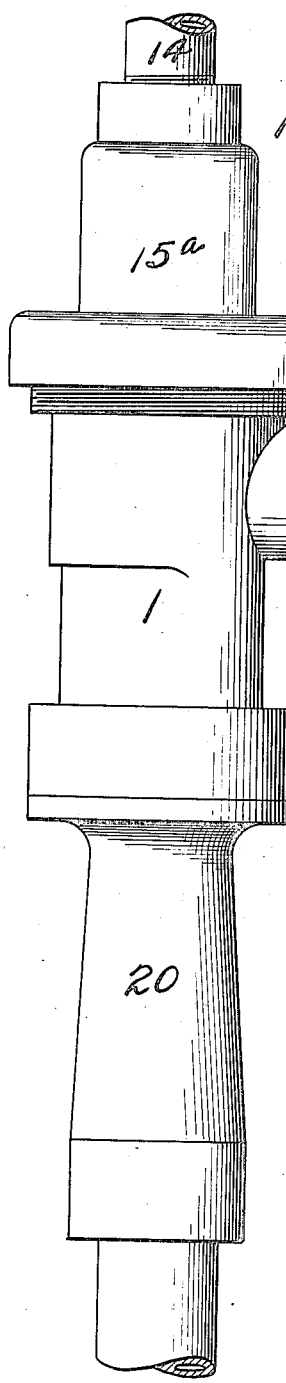
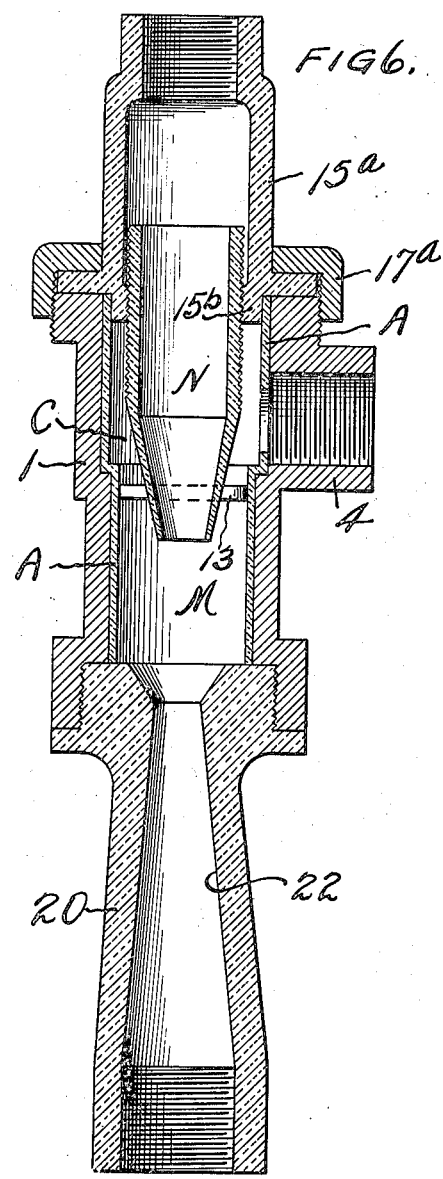

1,430,303

UNITED STATES PATENT OFFICE.

HARRY BUXTON HARTMAN, OF SCOTTDALE, PENNSYLVANIA, ASSIGNOR TO ELECTRIC WATER STERILIZER AND OZONE COMPANY, OF SCOTTDALE, PENNSYLVANIA, A CORPORATION OF PENNSYLVANIA.

PRESSURE-MIXING DEVICE FOR RAW WATER AND OZONE.

Application filed January 24, 1920. Serial No. 353,860.

*To all whom it may concern:*

Be it known that I, HARRY BUXTON HARTMAN, citizen of the United States, residing at Scottdale, in the county of Westmoreland and State of Pennsylvania, have invented certain new and useful Improvements in Pressure-Mixing Devices for Raw Water and Ozone, of which the following is a specification.

This invention relates to pressure fluid mixing devices and has particular reference to a construction especially adapted for use as a raw water and ozone mixer in connection with water purifying machines.

To this end the invention has generally in view a novel device which will automatically mix the fluids and water and ozone under pressure in such a manner that they are forced into intimate contact in a more or less agitated state, whereby the gaseous oxidizing agent ozone may actively attack the bacteria in the water to thereby initiate the purifying process, which is continued or prolonged in another part of the apparatus to insure a thorough treatment. In this connection it is proposed to provide a device wherein the discharge of raw water through the same will operate to draw the ozone gas from its source and into contact with the water and to expel both under pressure, thereby insuring an adequate supply of the purifying agent while the device is in operation, and also preventing waste which would otherwise result if the ozone gas was not controlled by the passage of the water through the device.

One of the objects of the invention is to provide a mixing device which may be conveniently made of or lined with a non-oxidizable non-corrosive material such as vitreous compositions, fibre compositions, and such special compositions as "bakelite," all of which are impervious to water and free from taste, and able to withstand the oxidizing tendency of the ozone even in the presence of moisture. The affinity of ozone gas for metallic and other substances is well known, and aside from the deterioration resulting from the action of the ozone on certain materials, it has a corrosive action on metal which may prove dangerous under certain conditions of use since foreign poisonous compounds such as nickel and copper salts may be formed and contaminate the water. Accordingly, the present invention has in view a device which will not be affected by the ozone, thereby to eliminate the possibility of the existence of the dangerous conditions above set forth.

A further object of the invention is to provide a device having a plurality of relatively interchangeable parts or units which enables the same to be standardized in sizes to meet the capacity of different machines. That is to say, it is proposed to provide a more or less permanent member as the body of the device which is capable of use in connection with other parts of suitable size and capacity to meet the varying requirements of different machines without the necessity of requiring a wholly separate and different device.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which—

Figure 1 is an elevation of the device.

Figure 2 is a vertical sectional view thereof.

Figure 3 is a horizontal section taken on the line 3—3 of Figure 2.

Figure 4 is a sectional view corresponding to Figure 3, of a modified form of baffle ring.

Figure 5 is an elevation of a metallic embodiment of the device having a non-oxidizable lining.

Figure 6 is a vertical sectional view of the construction shown in Figure 5.

Similar reference numerals designate corresponding parts throughout the several figures of the drawings.

In carrying the present invention into effect, it is proposed with a view to adapting the same to meet various needs as to size and capacity, to provide a main body member 1 which is preferably of the tubular formation shown in Figure 2 and provided at its upper end with an interiorly threaded socket 2 and at its opposite end with a similar socket 3 of slightly less diameter than the said socket 2. The intermediate portion of the body has a right angularly disposed nipple portion 4 exteriorly threaded as indicated at 5 and provided with an interior shoulder 6 which constitutes an abutment for the inner end of the ozone supply pipe 7 which may be fitted therein and held in place by means of the gland nut 8 to provide a tight slip joint fitting. The nipple 4 therefore affords a laterally disposed ozone intake port and also effectively receives the ozone supply pipe of non-oxidizable material.

The intermediate portion of the body, adjacent the nipple 4 is of enlarged diameter as indicated at 9 to provide for conducting ozone gas completely around the discharge end 10 of the water discharge ejector nozzle fitted in the upper end of the body and designated generally as N. That is to say the intermediate portion of the body 1 is enlarged at 9 to thereby cooperate with the tapering end of the nozzle N to form a relatively large annular ozone receiving chamber C to thereby insure the proper distribution of the ozone gas for mixing with the water issuing from the discharge end of the nozzle into the initial mixing chamber M of the body 1.

In connection with the water discharge nozzle N it is to be observed that the same is preferably exteriorly threaded as at 11 to engage with the interior threaded portion 12 of the body of the mixing device, while adjacent the extremity of the tapering end 10 the same is provided with an annular baffle flange or ring 13 which may be of the fluted edge formation shown in Figure 3, or of the perforated type as shown at 13$^a$ in Figure 4. The purpose of the baffle flange 13 is to cooperate with the ozone receiving chamber C to assist in the proper distribution of the ozone in the initial mixing chamber M, and the presence of the serrations or perforations in the flange serves to provide in effect a plurality of jets opening and discharging into the mixing chamber.

The upper end of the water ejector nozzle N projects through the socket 2 of the body and for the purpose of providing an adequate joint between the body 1 and the water supply pipe 14, a threaded sleeve 15, having a flange 16 on its lower end, is screwed on the pipe 14. A gland 17 which fits loosely around the sleeve 15 is screwed into the threaded socket 2 and presses the flange 16 against a ring of packing 16'. The nozzle N may be adjusted vertically to vary the capacity of the gas receiving chamber C before the pipe 14 is secured in place.

The lower end of the body 1 has fitted in the socket 3 thereof a Venturi mixing tube 20 which is preferably provided with a threaded end portion 21 for fitting in the said socket 3 and having an interior bore 23 which tapers toward its axis to the point 24, and thence flares outward as indicated at 25 to provide a relatively flaring discharge chamber 26. The formation of the interior bore of the Venturi member 20 provides in effect a restricted discharge orifice 24 which restrains or checks the flow of water and ozone in such a manner as to cause a thorough mixing of the same in the initial mixing chamber M in the body, thus insuring that the raw water is effectively attacked and surrounded by the oxidizing gas under pressure and restraint while being agitated by the passage of the fluids to thereby insure the gasification of the water to a maximum degree.

As previously indicated it is proposed in one embodiment of the invention to form the several parts of the present device of a moldable material which is non-oxidizing and non-corrosive and by reason of the relatively separable character of the three parts, namely the body, the raw water nozzle and the Venturi tube, the device may be easily assembled and taken apart, and when desired or required the body 1 may be utilized in connection with different size nozzles and different size Venturi tubes to accommodate different volumes of water and ozone.

According to another embodiment, and all-metal body part 1$^a$ may be used in making the device, and the same may be surfaced with an interior non-corrosive non-oxidizable lining A of vitreous or equivalent material as shown in Figures 5 and 6. That is to say the metallic body may be protected by an interior casing of vitreous or equivalent material while the nozzle end may be of the same type as in the former construction, and likewise the Venturi member 20 may remain the same. In this embodiment of the invention it is also necessary to utilize a slightly modified type of collar 15$^a$ having the relatively small interior threaded portion 15$^b$ for receiving the nozzle end, and being held in place by the ring nut 17$^a$.

In the operation of the device it will be observed that when water is not passing through the nozzle N, ozone is not drawn through the ozone inlet nipple 4. However when suction is created by the passage of water through the ejector nozzle in the chamber C ozone is thus drawn through or about the baffle flange 13 of the nozzle and mixed with the water in the chamber M. In other words the nozzle N has an ejector effect and draws the gas into the chamber M as soon as water passes through the device thereby insuring adequate treatment thereof to a maximum degree of efficiency.

The relatively adjustable mounting of the nozzle N within the body constitutes another distinctive feature of the invention, since by adjusting the discharge end of the nozzle with reference to the ozone intake port the amount of ozone drawn into the device may be regulated. That is to say, if the tapered discharge end of the nozzle projects considerably beyond the zone of the intake port a relatively small amount of ozone will be drawn through said port, and on the other hand, when the end of the nozzle is elevated to provide a relatively greater capacity for the chamber C, a correspondingly greater quantity of ozone may be taken into the device.

Accordingly, it will be apparent that the adjustment of the nozzle within the device has the effect of regulating the amount of ozone, while at the same time the ejector effect produced by the discharge of water from the outlet orifice of the nozzle creates a vacuum which draws the ozone from the generator into the mixing device in a reliable and effective manner.

Without further description it is thought that the many features and advantages of the invention will be readily apparent, and it will of course be understood that changes in the form, proportion, and minor details of construction may be resorted to without departing from the spirit of the invention or scope of the appended claims.

I claim:

1. A pressure mixing device for ozone water purifying apparatus including a body having a lateral ozone intake port, a Venturi member fitted to one end of the body, a raw water nozzle fitting into the other end of the body and having its discharge end projecting beyond the ozone inlet port, and a distributing baffle ring carried by the end of the nozzle.

2. A pressure mixing device for ozone water purifying apparatus including a body having a lateral ozone intake port, a Venturi member fitted to one end of the body, a raw water nozzle fitting into the other end of the body and having its discharge end projecting beyond the ozone inlet port, and a distributing baffle ring carried by the end of the nozzle, said ring having openings providing discharge jets between the nozzle and the body for distributing ozone about and around the water discharged from said nozzle.

3. A pressure mixing device for ozone water purifying apparatus including a body having an intermediate chamber provided with a lateral ozone intake port, a Venturi member fitted to one end of the body, a water ejector nozzle fitted in the opposite end of the body and extending through the chamber and beyond the port, said nozzle having a tapering end portion and adapted to be set within the body to determine the capacity of the ozone receiving chamber.

In testimony whereof I hereunto affix my signature.

HARRY BUXTON HARTMAN.

Witness:
EMORY L. GRAFF.